(12) United States Patent
Takahashi et al.

(10) Patent No.: US 6,261,684 B1
(45) Date of Patent: Jul. 17, 2001

(54) INFRARED-BLOCKING TRANSPARENT FILM

(75) Inventors: Shinichi Takahashi; Kazunori Ikegaya, both of Shizuoka (JP)

(73) Assignee: Tomoegawa Paper Co., LTD, Tokyo (JP)

( * ) Notice: Subject to any disclaimer, the term of this patent is extended or adjusted under 35 U.S.C. 154(b) by 0 days.

(21) Appl. No.: 09/215,623

(22) Filed: Dec. 17, 1998

(30) Foreign Application Priority Data

Dec. 17, 1997 (JP) ...................................... 9-364127

(51) Int. Cl.[7] ................. B32B 15/04; B32B 7/12
(52) U.S. Cl. .................. 428/345; 428/354; 428/328; 428/327; 428/323
(58) Field of Search .................... 428/345, 354, 428/328, 327, 323

(56) References Cited

U.S. PATENT DOCUMENTS 4,954,383 * 9/1990 King et al. ..................... 428/131
5,518,810 * 5/1996 Nishihara et al. ................. 428/328

OTHER PUBLICATIONS

English language abstract of Japanese Patent Publication No. 08041441 A dated Feb. 13, 1996.
English language abstract of Japanese Patent Publication No. 07070363 A dated Mar. 14, 1995.
English language abstract of Japanese Patent Publication No. 07069632 A dated Mar. 14, 1995.

* cited by examiner

Primary Examiner—Daniel Zirker
Assistant Examiner—Frederick G. Dean
(74) Attorney, Agent, or Firm—Scully, Scott, Murphy & Presser

(57) ABSTRACT

The present invention provides an infrared ray blocking transparent film which can be produced at low cost despite using indium tin oxide powder (which can inhibit metallic luster) and which can exhibit excellent electromagnetic wave transmissivity. An infrared ray blocking layer is provided on at least a surface of a base film, and the infrared ray blocking layer includes indium tin oxide powder and resin in a weight ratio of 90/10 to 60/40.

8 Claims, 1 Drawing Sheet

INFRARED-BLOCKING TRANSPARENT FILM

BACKGROUND OF THE INVENTION

The present invention relates to an infrared ray blocking transparent film, for example, a film adhered to a windowpane of a building, an automobile, or the like, primarily in order to block infrared ray in sunlight.

Transparent films having infrared ray blocking properties, transparency (transmissivity) for visible light, and properties of reflection or absorbing of infrared light, have been used for controlling the thermal effects of solar radiation. For example, an infrared ray blocking film is adhered to a windowpane of a building or an automobile or the like so as to reduce heat caused by direct sunlight being transmitted therethrough. In the summer, air conditioning load is reduced by reducing the elevation of room temperature, and in the winter, the heat insulating efficiency at room temperature is improved. As an additional effect, if the windowpane is broken, the scattering of pieces of glass is prevented. In general, such an infrared ray blocking transparent film is formed in such a way that an infrared ray blocking layer is provided on one surface of a base film composed of a synthetic resin such as PET (polyethylene terephthalate) or the like, a hard coat layer as a surface protective layer is laminated on another surface of the base film, and a separate material composed of paper, film, or the like, is adhered via an adhesive layer on the surface of the infrared ray blocking layer. When the film is affixed, the separate material is taken off, whereby the adhesive layer may be adhered to a glass plate.

The infrared ray blocking layer has been formed on a base film by coating various kinds of infrared ray absorbers (for example, immonium, aluminum, and anthraquinone-type compounds) or an infrared ray reflecting material (for example, ZnO, $SnO_2$, and phthalocyan-type pigments, or the like). However, when the conventional infrared ray absorber is used, the layer is a dark brown or a dark blue, whereby transparency of the layer is inferior since visible light transmissivity is lowered to 50% or less. Alternatively, the layer can absorb only infrared ray having long wavelengths ranging from 1000 to 1500 nm or more, or the layer can absorb only infrared ray having a very small range of wavelengths. Therefore, in order to overcome the above-mentioned defects of the infrared ray absorber and the infrared ray reflecting material, indium tin oxide powder (hereinafter referred to as ITO) which was developed as a conductive coating material, has come into use. In this case, the ITO powder is coated on a base film by a vacuum deposition method or a sputtering method to form a thin film.

The ITO powder may be formed on a base film by a vacuum deposition method or a sputtering method, thereby reflecting infrared ray having wavelengths ranging from 800 to 2500 nm, so that an infrared ray blocking film having high transparency can be provided. However, these methods require a high-vacuum performance apparatus and a high-precision atmosphere controlling system; the cost of production therefore increases and adversely affects mass-productivity. The properties of the method for forming a thin film results in a metallic luster on the reflection surface for visible ray, which is esthetically undesirable even if the film has high transparency. Furthermore, the film has a comparatively low resistance with respect to electromagnetic waves and therefore tends to absorb electromagnetic waves, so that a mobile telephone or a car navigation system occasionally cannot be used inside a vehicle.

Therefore, it is an object of the present invention to provide an infrared ray blocking transparent film which can be produced at low cost even though it employs an ITO powder, which can inhibit occurrence of metallic luster, and which can exhibit excellent electromagnetic wave transmissivity.

SUMMARY OF THE INVENTION

The inventors have discovered that the most suitable method to accomplish the object is to mix and disperse a conductive coating material in a conductive transparent ITO powder in a resin, which is then laminated on a base film by a coating method, thereby accomplishing the present invention. In particular, after conducting diligent research with regard to the compounding ratio of the ITO powder and the resin, in the case in which the compounding ratio of the ITO powder and the resin is 90/10 to 60/40 by weight, preferably 85/15 to 65/35, and more preferably 80/20 to 70/30, the infrared ray blocking film having high transparency with low haze (for example, having a HAZE value according to the Japanese Industrial Standard K 7105 of 1.0 or less) can be obtained. It should be noted that the numerical limitations are based on the following. In the case in which the compounding ratio of the ITO powder is 90% by weight or more, the film is colored by the ITO powder and the haze degree thereof increases, thereby increasing metallic luster and causing peeling or cohesive failure of the infrared ray blocking layer, so that the adhesion to a base film becomes inferior. In the case in which the compounding ratio of the ITO powder is 60% by weight or less, the object, i.e., infrared ray blocking ability is not obtained, thereby resulting in undesirably high HAZE values due to the difference between refractive indexes of the particles of the ITO powder and that of the resin. When the invention is used in practice, a hard coat layer is laminated by coating a hard coat material on a front surface of a base film or an infrared ray blocking layer. An adhesive layer is then laminated by coating an adhesive material on a rear surface of the base film, thereby constructing a completed film. Then, the adhesive layer of the film is adhered to a glass plate or the like. As a base film, a hard coat material, and an adhesive material, materials having high transparency must be used.

Therefore the infrared ray blocking transparent film according to the present invention is characterized by comprising a base film and an infrared ray blocking layer provided on at least a surface of the base film, and the infrared ray blocking layer includes the indium tin oxide powder and the resin in a weight ratio ranging from 90/10 to 60/40.

The infrared ray blocking transparent film having high transparency with low haze (low HAZE value) can be obtained by the composition described above. Conductive coating material mixed with the ITO powder into the resin is laminated on a base film by a coating method, so that the cost for forming a thin film decreases remarkably, as compared with a vacuum deposition method or a sputtering method, and metallic luster is inhibited. Furthermore, the ITO powder is dispersed into the resin, whereby the electromagnetic wave transmissivity is excellent; for example, a mobile telephone or a car navigation system can be used in an automobile without hindrance. As a method for coating a conductive coating material mixed with the ITO powder in the resin, a wire bar coating method, a doctor blade coating method, a gravure coat method, a dip coat method, or the like can be applied.

In the present invention, a pigment such as ZnO, $SnO_2$, $TiO_2$, or the like, can be added into the infrared ray blocking layer. In other words, an infrared ray blocking layer may be composed of the resin mixed with these pigments and the ITO powder. The pigments are employed as infrared ray blockers with the ITO powder and the wavelengths blocked by the infrared ray blocking pigments range from 1200 to 2500 nm. Therefore, the ITO powder is combined to shield against the range of infrared wavelengths from 800 to 2500 nm (the so-called "near infrared"). In addition, the pigments are mixed with the resin, thereby setting tip the compounding ratio of the ITO powder within the lower end of the above range, so that the amount used of the ITO powder, which is relatively expensive, is reduced, and the overall cost can be reduced. Furthermore, the average particle size of these pigments must be 100 nm or less in order to obtain metallic luster inhibition and excellent electromagnetic wave transmissivity.

The present invention is a film intended mainly for infrared ray blocking, and at the same time, a UV absorber may be added in at least one layer among the layers, so as to also obtain a UV blocking effect.

In the following, the component materials for each layer of the infrared ray blocking transparent film having the composition described above according to the present invention will be explained in detail.

A. Base Film

As the base film, a conventional transparent film can be employed. For example, various resin films such as polyethylene terephthalate (PET), triacetyl cellulose (TAC), polyacrylate, polyether, polycarbonate, polysulfone, polyether sulfone, cellophane, polyethylene, polypropylene, polyvinyl alcohol, or the like, may be preferably employed. Of these materials, TAC is preferable from the viewpoint of transparency.

B. ITO Powder of the Infrared Ray Blocking Layer

It is believed that transparency and uniformity of the infrared ray blocking layer according to the present invention depends on the average particle size of the ITO powder. Therefore, the inventors conducted diligent research with regard to transparency and uniformity of various layers employing ITO powders of different average particle size. As a result, in the case when the average particle size of the ITO powder is 100 nm or less, transparency and uniformity of the layer are particularly excellent and in the case when the average particle size of the ITO powder is 50 nm or less, and more preferably 25 to 35 nm, a clear view and electromagnetic wave transmissivity are obtained.

ITO powders can be obtained by well-known methods. For example, an aqueous solution including a water soluble salt of In and a small amount of water soluble salt of Sn is reacted with alkali, whereby a hydroxide of In and Sn is coprecipitated. Then, the coprecipitated compound is obtained as a raw material, the raw material is sintered in a reducing atmosphere of CO, $NH_3$, $H_2$, or the like, and is transformed into an oxide, whereby an ITO powder is obtained. The ITO powder may be obtained by sintering the raw material in a reducing atmosphere. The mole ratio of $In/Sn/O_2$ is 100/5~10/0.5~10, and preferably 100/5~10/ 0.5~2. Such obtained ITO powders turn blue. Such ITO powders are extremely excellent in infrared ray blocking so that the shortest wavelength is 800 nm. In addition, as described above, the average particle size of the ITO powder is preferably 100 nm or less, and more preferably 50 nm or less.

C. Resin of the Infrared Ray Blocking Layer

As the resin mixed dispersively with the ITO powder and bound for the ITO powder, a UV-curing resin such as an acryl-type resin, urethane-type resin, epoxy-type resin, or the like; a thermosetting resin such as melamine resin, polyurethane resin, silicone resin, silicone-modified resin, or the like; and a thermoplastic resin such as an acryl type resin, urethane type resin, or polyester type resin, which have high transparency similar to that of a base film, can be chosen and employed in an appropriate ratio.

D. Pigments

As the pigment mixed in the infrared ray blocking layer, as described above, there can be mentioned a pigment such as ZnO, $SnO_2$, $TiO_2$, or the like.

E. Hard Coat Material (Hard Coat Layer)

As a hard coat material for forming a hard coat layer or for mixing into an infrared ray blocking layer, a resin cured by means of radiation or heat, or a combination thereof, can be employed.

As a radiation-cured resin, compounds mixed with a monomer, oligomer, and prepolymer including a polymerizable unsaturated bond such as an acryloyl group, a methacryloyl group, an acryloyloxy group, a methacryloyloxy group, or the like, can be employed in an appropriate ratio. As an example of a monomer, there can be mentioned styrene, methyl acrylate, methyl methacrylate, methoxy polyethylene methacrylate, cyclohexyl methacrylate, phenoxy ethyl methacrylate, ethylene glycol dimethacrylate, dipenta erythritol hexaacrylate, trimethylolpropane trimethacrylate, or the like. As an oligmer or prepolymer, there can be mentioned an acrylate such as polyester acrylate, polyurethane acrylate, epoxy acrylate, polyether acrylate, alkyd acrylate, melamine acrylate, silicone acrylate, or the like, an unsaturated polyester, an epoxy-type compound, or the like. These can be employed alone or in combination. In the case in which flexibility of the curing film is required, the amount of monomer employed is reduced. Furthermore, in order to reduce cross-linking density, it is preferable that an acrylic monomer having mono-functional or bi-functional acrylate be employed. Whereas in the case in which hard durability such as thermal resistance, wear resistance, solvent resistance, or the like, of the curing film is required, it is preferably that the amount of monomer be increased or that an acrylic monomer having tri-functional or greater acrylate be employed.

As a thermosetting resin, melamine resin, polyurethane resin, silicone resin, silicone-modified resin, or the like, can be employed in an appropriate ratio.

In order to cure the radiation-curing resin as described above, for example, it is necessary that radiation such a UV, electron beam, X-ray, or the like, be irradiated on the resin, and a polymerization initiator can be added to the resin in an appropriate ratio, as necessary. And the thermosetting resin as described above can be cured by heating. In the case of curing by means of irradiating UV, a photopolymerization initiator must be added. As a photopolymerization initiator, there can be mentioned an acetophenone such as diethoxy acetophenone, 2-hydroxy-2-methyl-m-phenylpropan-1-one, benzyl dimethyl ketal, 1-hydroxycyclohexyl-phenylketone, 2-methyl-2-monophorino (4-thiomethylphenyl) propan-1-one, or the like, a benzoin ether such as benzoin methylether, benzoin ethylether, benzoin isopropylether, benzoin isobutylether, or the like, a benzophenone such as benzophenone, o-benzoyl ethyl benzoate, 4-phenyl benzophenone, 4-benzoyl-4'-methyl-diphenylsulfide, 4-benzoyl-N,N-dimethyl-N-[2-(1-oxo-2-propenyloxy) ethyl]benzene methanaminuim bromide, (4-benzoylbenzyl) trimethyl ammonium chloride, or the like, a thioxanthone such as 2,4-diethyl thioxanthone, 1-chloro-4-dichloro thioxanthone, or the like, 2,4,6-trimethylbenzoyl diphenyl-benzoyl oxide, or the like. These can be employed alone or in combination. In addition, as an accelerator (sensitizer), an amine-type compound such as N,N-dimethyl paratoluidine, 4,4'-diethylamino benzophenone, or the like, can be employed in combination.

As a resin employed as a hard coat material, since there is little oxygen inhibition, and since transparency and adhesion of the layer and dispersibility of the ITO powder are excellent, in particular, an epoxy-type compound of a UV-curing-type including at least a photo-cationic polymerization initiator as a polymerization initiator is preferable. As an example of epoxy-type compounds, there can be mentioned a glycidyl ether such as tetramethylene glycol diglycidyl ether, propylene glycol diglycidyl ether, neopentyl glycol diglycidyl ether, bisphenol A diglycidyl ether, or the like, an epoxy ester such as 2-hydroxy-3-phenoxypropyl acrylate, an adduct of bisphenol A-diepoxy-acrylic acid, or the like. The photo-cationic polymerization initiators are preferably employed in an amount of 0.1% by weight to 10% by weight based on the primary agent (epoxy-type compound). With less than 0.1% by weight or more than 10% by weight of the photo-cationic polymerization initiators, UV-curing is insufficient.

F. Adhesive Layer

As an adhesive material for forming an adhesive layer, for example, an acrylic adhesive material may be employed. As a curing agent, for example, a cross-linking agent of metal-chelate-type, isocyanate-type or epoxy-type may be employed alone or in combination at an appropriate ratio. Such an adhesive material compounded so that adhesion (according to Japanese Industrial Standard Z0237) in the adhesive layer ranges from 100 to 2000 g per 25 mm is preferable in practice. In addition, thickness of the adhesive layer is preferably from 15 to 25 $\mu$m after setting.

G. Other Materials

Solvents added to the conductive coating materials forming the infrared ray blocking layer The conductive coating materials forming the infrared ray blocking layer comprises of the ITO powder and the resin. As a solvent therefore various organic solvents such as benzene, toluene, acetone, methylethylketone, isophorone, cyclohexanone, or the like, can be added alone or in a combination of two or more thereof in an appropriate ratio.

Surfactants Added to the Conductive Coating Materials Forming the Infrared Ray Blocking Layer In order to improve dispersibility of the ITO powder, a very small quantity of surfactant (for example, a non-ionic type) can be added to the conductive coating materials forming the infrared ray blocking layer.

DETAILED DESCRIPTION OF THE PREFERRED EMBODIMENTS

An infrared ray blocking transparent film according to the present invention comprises an infrared ray blocking layer provided by coating conductive coating materials of an ITO powder and resins on a front surface of a base film; a hard coat layer is provided on a front surface of an infrared ray blocking layer; and an adhesive layer is provided on a rear surface of the base film. The preferred embodiments are as follows.

Figure 1:
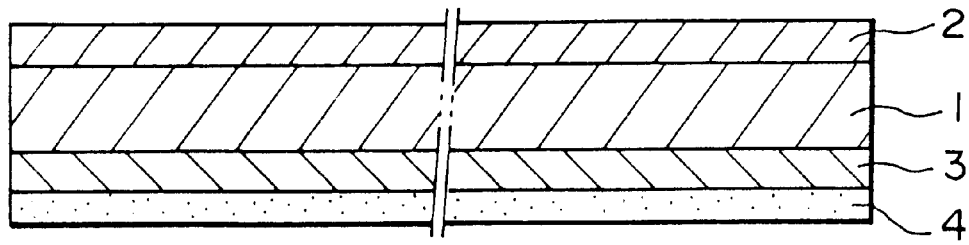
FIG. 1 is a schematic cross-section showing a lamination of an infrared ray blocking transparent film according to an embodiment of the present invention.

A. First Lamination As shown in FIG. 1, a hard coat layer 2 is provided on a front surface (top of drawing) of base film 1, and an infrared ray blocking layer 3 is provided on a rear surface (bottom of drawing) of base film 1. Furthermore, an adhesive layer 4 is provided on a rear surface of this infrared ray blocking layer 3.

Figure 2:
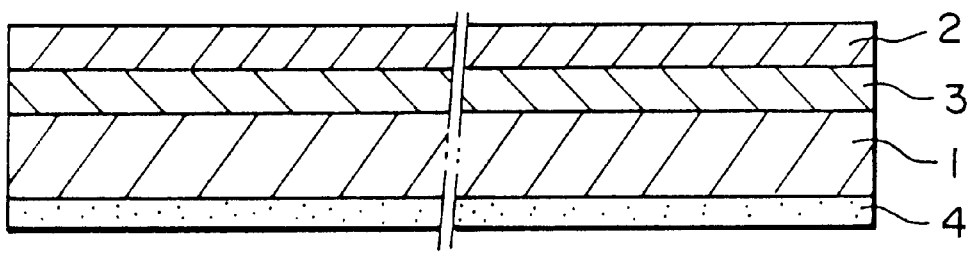
FIG. 2 is a schematic cross-section showing a lamination of another infrared ray blocking transparent film according to an embodiment of the present invention.

B. Second Lamination As shown in FIG. 2, an infrared ray blocking layer 3 is provided on a front surface of base film 1, a hard coat layer 2 is provided on a front surface of this infrared ray blocking layer 3, and an adhesive layer 4 is provided on a rear surface of base film 1. In this way, when the film to be adhered on a glass plate is torn off for modification or the like, the film can be torn off smoothly from a glass plate since the adhesion between adhesive layer 4 and base film 1 is strong.

C. Third Lamination

Figure 3:
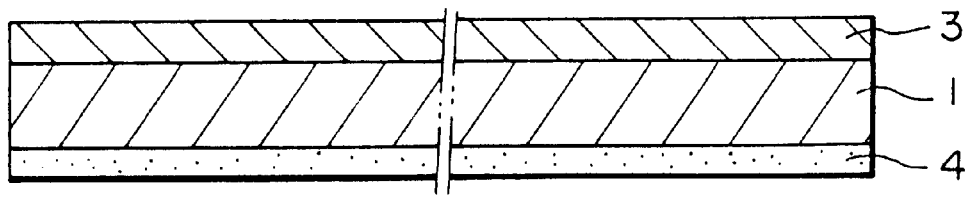
FIG. 3 is a schematic cross-section showing a lamination of another infrared ray blocking transparent film according to an embodiment of the present invention.

As shown in FIG. 3, an infrared ray blocking layer 3 is provided on a front surface of base film 1, and an adhesive layer 4 is provided on a rear surface of base film 1. In this case, resin comprising of an infrared ray blocking layer 3 is used as the binding material of the infrared ray blocking layer and as the hard coat material. Therefore, an infrared ray blocking layer 3 as a surface layer is an infrared ray blocking layer combined with a hard coat layer. For this reason, the number of layers is decreased, and the difference between refractive indexes of layers is reduced. As a result, increased transmissivity of the film, improved transparency, and improved productivity is possible, and therefore lamination is most preferable.

EXAMPLES

The characteristics according to the present invention will be explained with Examples.

Example 1

[Composition of the Conductive Coating Material]

ITO powder, 30 g (primary particle size: 30 nm; component mole ratio $In/Sn/O_2=100/5\sim10/0.9$; blue powder)

Resin (hard coat material)

Acrylic-Epoxy-type UV-curing resin contained a photo-cation polymerization initiator, 10 g (Trade name: KR-566; produced by Asahi Electrochemical Industry Co., Ltd.)

Solvent

Cyclohexanone, 60 g

The conductive coating material was obtained by mixing and dispersing the above-described materials using a paint shaker with acrylic beads for 10 hours.

Subsequently, the mixed conductive coating material, with the acrylic beads removed, was coated using an applicator on one surface (front surface) of a high-transparency PET film (trade name: Merimex #707; produced by ICI Corporation) as a base film having a film thickness of 25 $\mu$m and was dried at 100° C. Thereafter, the film was irradiated at 120 W by UV radiation to cure the conductive coating material, and an infrared ray blocking layer having a thickness of 3 $\mu$m was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated, using an applicator, on a rear surface of the PET film and was dried at 100° C. and an adhesive layer having a thickness of 20 μm was formed; an infrared ray blocking transparent film was thereby obtained.

Example 2

[Composition of the Conductive Coating Material]
ITO powder, similar to Example 1, 32 g
Resin (hard coat material)
 Acrylic-Epoxy-type UV-curing resin contained a photo-cation polymerization initiator, 8 g (Trade name: KR-566; produced by Asahi Electrochemical Industry Co., Ltd.)
Solvent
Cyclohexanone, 60 g The conductive coating material was obtained by mixing and dispersing the above-described materials using a paint shaker with acrylic beads for 10 hours.

Subsequently, the mixed conductive coating material, with the acrylic beads removed, was coated using an applicator on one surface (front surface) of a high-transparency PET film (trade name: Merimex #707; produced by ICI Corporation) as a base film having a film thickness of 25 μm and was dried at 100° C. Thereafter, the film was irradiated at 120 W by UV radiation to cure the conductive coating material, and an infrared ray blocking layer having a thickness of 3 μm was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated, using an applicator, on a rear surface of the PET film and was dried at 100° C. and an adhesive layer having a thickness of 20 μm was formed; an infrared ray blocking transparent film was thereby obtained.

Example 3

[Composition of the Conductive Coating Material]
ITO powder, similar to Example 1, 26 g
Resin (hard coat material)
 Acrylic-Epoxy-type UV-curing resin contained a photo-cation polymerization initiator, 14 g (Trade name: KR-566; produced by Asahi Electrochemical Industry Co., Ltd.)
Solvent
Cyclohexanone, 60 g The conductive coating material was obtained by mixing and dispersing the above-described materials using a paint shaker with acrylic beads for 10 hours.

Subsequently, the mixed conductive coating materials, with the acrylic beads removed, was coated using an applicator on one surface (front surface) of a high-transparency PET film (trade name: Merimex #707; produced by ICI Corporation) as a base film having a film thickness of 25 μm and was dried at 100° C. Thereafter the film was irradiated at 120 W by UV radiation to cure the conductive coating material, and an infrared ray blocking layer having a thickness of 3 μm was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated, using an applicator, on a rear surface of the PET film and dried at 100° C. and an adhesive layer having a thickness of 20 μm was formed; an infrared ray blocking transparent film was thereby obtained.

Example 4

[Composition of the Conductive Coating Material]
ITO powder, similar to Example 1, 30 g
Resin (hard coat material)
Polyester type resin, 10 g (Trade name: Vylon 200; produced by Toyobo Corporation)
Solvent
Cyclohexanone, 60 g The polyester-type resin (Vylon 200) was mixed, stirred, and dissolved in 60 g of cyclohexanone in advance.

The conductive coating material was obtained by mixing and dispersing the above-described materials using a paint shaker with acrylic beads for 10 hours.

Subsequently, the mixed conductive coating material, with the acrylic beads removed, was coated using an applicator on one surface (rear surface) of a high-transparency PET film (trade name: Merimex #707; produced by ICI Corporation) as a base film having a film thickness of 25 μm and an infrared ray blocking layer having a thickness of 1.5 μm was formed by drying at 100° C. Subsequently, a UV-curing resin contained a photo-cation polymerization initiator (trade name: KR-566; produced by Asahi Electrochemical Industry Co., Ltd.), which is the hard coat material, was coated on the other surface of the PET film using an applicator. Thereafter, the film was irradiated by UV radiation at 120 W to cure the hard coat material and a hard coat layer having a thickness of 3 μm was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated on a surface (rear surface) of the infrared ray blocking layer using an applicator and was dried at 100° C. and an adhesive layer having a thickness of 20 μm was formed; an infrared ray blocking transparent film was thereby obtained.

Example 5

[Composition of the Conductive Coating Material]
ITO powder, similar to Example 1, 30 g
Resin (hard coat material)
Polyester type resin, 10 g (Trade name: Vylon 200; produced by Toyobo Corporation)
Solvent
Cyclohexanone, 60 g The polyester-type resin (Vylon 200) was mixed, stirred, and dissolved in 60 g of cyclohexanone in advance.

The conductive coating material was obtained by mixing and dispersing the above-described materials using a paint shaker with acrylic beads for 10 hours.

Subsequently, the mixed conductive coating material, with the acrylic beads removed, was coated using an applicator on one surface (front surface) of a high-transparency PET film (trade name: Merimex #707; produced by ICI Corporation) as a base film having a film thickness of 25 μm and an infrared ray blocking layer having a thickness of 1.5 μm was formed by drying at 100° C. Subsequently, a UV-curing resin contained a photo-cation polymerization initiator (trade name: KR-566; produced by Asahi Electrochemical Industry Co., Ltd.), which is the hard coat material, was coated on a surface (front surface) of the infrared ray blocking layer using an applicator. Thereafter, the film was irradiated by UV radiation at 120 W to cure the hard coat material and a hard coat layer having a thickness of 3 μm was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated on a surface (rear surface) of the PET film using an applicator, and was dried at 100° C. and an adhesive layer having a thickness of 20 μm was formed; an infrared ray blocking transparent film was thereby obtained.

Example 6

[Composition of the Conductive Coating Material]
ITO powder, similar to Example 1, 20 g
Resin (hard coat material)
Acrylic-Epoxy-type UV-curing resin contained a photo-cation polymerization initiator, 10 g (Trade name: KR-566; produced by Asahi Electrochemical Industry Co., Ltd.)
Pigment ($SnO_2$), 10 g
Solvent
Cyclohexanone, 60 g The conductive coating material was obtained by mixing and dispersing the above-described materials using a paint shaker with acrylic beads for 10 hours.

Subsequently, the mixed conductive coating material, with the acrylic beads removed, was coated using an applicator on one surface (front surface) of a high-transparency PET film (trade name: Merimex #707; produced by ICI Corporation) as a base film having a film thickness of 25 μm and was dried at 100° C. Thereafter, the film was irradiated by UV radiation at 120 W to cure the conductive coating material and an infrared ray blocking layer having a thickness of 3 μm was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated on a rear surface of the PET film using an applicator, and was dried at 100° C. and an adhesive layer having a thickness of 20 μm was formed; an infrared ray blocking transparent film was thereby obtained.

Comparative Example 1

[Composition of the Conductive Coating Material]
ITO powder, similar to Example 1, 10 g
Resin (hard coat material)
Acrylic-Epoxy-type UV-curing resin contained a photo-cation polymerization initiator, 30 g (Trade name: KR-566; produced by Asahi Electrochemical Industry Co., Ltd.)
Solvent
Cyclohexanone, 60 g The conductive coating material was obtained by mixing and dispersing the above-described materials using a paint shaker with acrylic beads for 10 hours.

Subsequently, the mixed conductive coating material, with the acrylic beads removed, was coated using an applicator on one surface (front surface) of a high-transparency PET film (trade name: Merimex #707; produced by ICI Corporation) as a base film having a film thickness of 25 μm and was dried at 100° C. Thereafter, the film was irradiated by UV radiation at 120 W to cure the conductive coating material and an infrared ray blocking layer having a thickness of 3 μm was formed. Subsequently, an acrylic adhesive material (trade name: AS-6000; produced by Ippousha Fats and Oils Industry Co., Ltd.) was mixed with a UV absorber (trade name: Thynubine T-328; produced by CIBA-GEIGY AG.; total solid concentration: 3%) and the mixture was coated on a rear surface of the PET film using an applicator, and was dried at 100° C. and an adhesive layer having a thickness of 20 μm was formed; an infrared ray blocking transparent film was thereby obtained.

Comparative Example 2

The infrared ray blocking layer having a thickness from 50 to 150 nm was formed on a surface of the PET film in a manner similar to that of Example 1 by a sputtering method, using the ITO powder in a manner similar to that of Example 1

With regard to the infrared ray blocking films obtained in Examples 1 to 6 and the comparative infrared ray blocking films obtained in Comparative Examples 1 to 2, HAZE values were measured using a HAZE meter produced by Toyo Seiki Corporation, and transparency was evaluated by these values. The results are shown in Table 1. In Table 1, the ITO powder or the resin content to the total composition of the conductive coating material composing the ITO powder, the resin, and the solvent, is shown in units of "weight percent". With regard to infrared ray blocking ability, light transmitted through the film was measured at wavelengths of 1000, 1200, and 1500 nm, using a spectrophotometer produced by Shimazu Seisakusho Corporation. In this evaluation, the following criteria were used: cases where all transmittances were 50% or less: ◯; cases where one or two transmittances were 50% or less: Δ; and cases where all transmittances were more than 50%: X. Metallic luster inhibition was observed by color on the entire surface of the film, and was evaluated according to the following criteria: lead color: X; others: ◯. Electromagnetic wave transmissivity was measured with electromagnetic waves at 300 MHz, using electromagnetic wave measuring equipment produced by Advantest Corporation, and was evaluated according to the following criteria: cases where the measured value was 0 dB: ◯; others: X.

TABLE 1

| | Composition of the conductive coating material | | | | Infrared Ray | | Electromagnetic |
|---|---|---|---|---|---|---|---|
| Sample | A: ITO | B: Resin | Weight ratio (A/B) | HAZE Value | Blocking Ability | Metallic Luster Inhibition | Wave Transmissivity |
| Example 1 | 30 | 10 | 75/25 | 0.8 | ◯ | ◯ | ◯ |
| Example 2 | 32 | 8 | 80/20 | 0.7 | ◯ | ◯ | ◯ |
| Example 3 | 26 | 14 | 65/35 | 0.8 | ◯ | ◯ | ◯ |
| Example 4 | 30 | 10 | 75/25 | 0.9 | ◯ | ◯ | ◯ |
| Example 5 | 30 | 10 | 75/25 | 0.7 | ◯ | ◯ | ◯ |
| Example 6 | 20 | 10 | 75/25* | 1.3 | ◯ | ◯ | ◯ |
| Comparative Example 1 | 100 | 14.2 | 25/75 | 30.0 | X | ◯ | ◯ |
| Comparative Example 2 | 100 | — | — | 30.0 | ◯ | X | X |

*indicates weight ratio of (ITO powder + $SnO_2$)/Resin

As is apparent from the results shown in Table 1, the infrared ray blocking transparent films according to the present invention exhibit excellent properties. In contrast, the comparative infrared ray blocking transparent film according to Comparative Example 1 is not satisfactory according to the requirements of the present invention in practice because the infrared ray blocking ability is inferior. Furthermore, the comparative infrared ray blocking transparent film according to Comparative Example 2 is confirmed to have less metallic luster inhibition and electromagnetic wave transmissivity.

As explained above, according to the present invention, infrared ray blocking transparent films which are produced at low cost despite using the ITO powder, which inhibit metallic luster, and which exhibit excellent electromagnetic wave transmissivity, can be provided.

What is claimed is:

1. An infrared ray blocking transparent film comprising a base film, an infrared ray blocking layer provided on at least a surface of said base film, a hard coat layer provided on a front surface of said infrared ray blocking layer, and an adhesive layer provided on a rear surface of said base film, wherein said infrared ray blocking layer includes an indium tin oxide powder and a resin in a weight ratio from 90/10 to 60/40, and said hard coat layer comprises an epoxy-type compound and a photo-cation polymerization initiator.

2. An infrared blocking transparent film comprising a base film, an infrared ray blocking layer provided on at least a surface of said base film, and an adhesive layer provided on a rear surface of said base film, wherein said infrared ray blocking layer includes an indium tin oxide powder and a resin in a weight ratio from 90/10 to 60/40, and said resin is a hard coat material comprising an epoxy-type compound and a photo-cation polymerization initiator.

3. The infrared ray blocking transparent film of claim 1 wherein said infrared ray blocking layer further comprises pigments.

4. The infrared ray blocking transparent film of claim 2 wherein said infrared ray blocking layer further comprises pigments.

5. The infrared ray blocking transparent film of claim 1 wherein said indium tin oxide powder has a mole ratio of oxygen to indium of 0.5/100 to 10/100.

6. The infrared ray blocking transparent film of claim 2 wherein said indium tin oxide powder has a mole ratio of oxygen to indium of 0.5/100 to 10/100.

7. The infrared ray blocking transparent film of claim 3 wherein said indium tin oxide powder has a mole ratio of oxygen to indium of 0.5/100 to 10/100.

8. The infrared ray blocking transparent film of claim 4 wherein said indium tin oxide powder has a mole ratio of oxygen to indium of 0.5/100 to 10/100.

\* \* \* \* \*